Nov. 8, 1955

V. P. MAGNUSON 2,723,346

DELAYED SWITCHING CIRCUIT

Filed April 23, 1951

INVENTOR:
Vernon P. Magnuson

By Herbert E. Metcalf
HIS PATENT ATTORNEY 2,723,346

DELAYED SWITCHING CIRCUIT

Vernon P. Magnuson, Los Angeles, Calif., assignor to Northrop Aircraft, Inc., Hawthorne, Calif., a corporation of California Application April 23, 1951, Serial No. 222,392

8 Claims. (Cl. 250—27)

This invention relates to electronic delay switches and, more particularly, to a means for delaying the operation of a switching mechanism controlled from pulse input for example.

Uses of electronic delay switches are manifold. Often it is desired to defer the change from one circuit condition to another or to provide timed control for a circuit component. Then a circuit such as the invention undergoing specification is of great utility.

It is, accordingly, an object of this invention to provide an initial delay in a switching circuit after the receipt of a pulse from a trigger circuit.

It is a further object of this invention to provide means for varying the hold-in time of a relay as a function of the magnitude of a capacitor, the coil resistance of the relay and the impedance of a pulse-forming source.

Another object of this invention is to provide means for discriminating the polarity of changes of potential arising from the potential source so as to operate a current-operated device according to predetermined conditions.

In a preferred embodiment of the invention, a condenser and two crystal diodes are wired in series. The crystal diodes are wired in such a manner that current flow between them is oposed. A suitable relay, whose coil is connected at one end between the condenser and one crystal diode and connected at the other end to a lead joining the two like polarity terminals of the said diodes, is consequently delayed in switching when an adjoining trigger circuit is triggered.

The invention will be more fully understood by referring to the accompanying drawings, in which.

A crystal diode is essentially a rectifier, characterized by high resistance to current flow in one direction and low resistance to current flow in the opposite direction.

Figure 1:
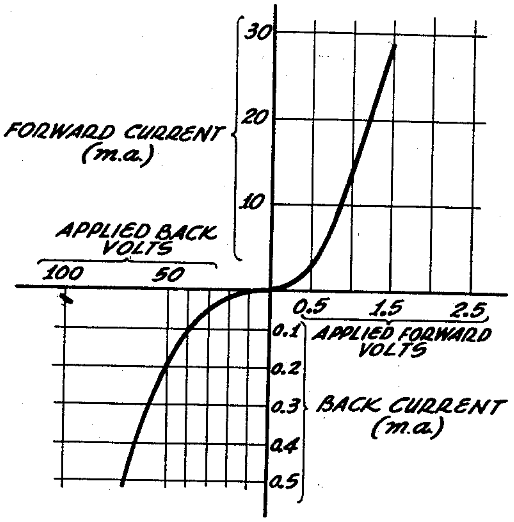
Figure 1 is a graph illustrating typical static characteristics for a crystal diode.

Figure 1 is a graph of the forward and back currents of a typical germanium diode as a function of applied voltage. It is apparent that greater voltage is required to produce a back current equal in magnitude to a given forward current.

Figure 2:
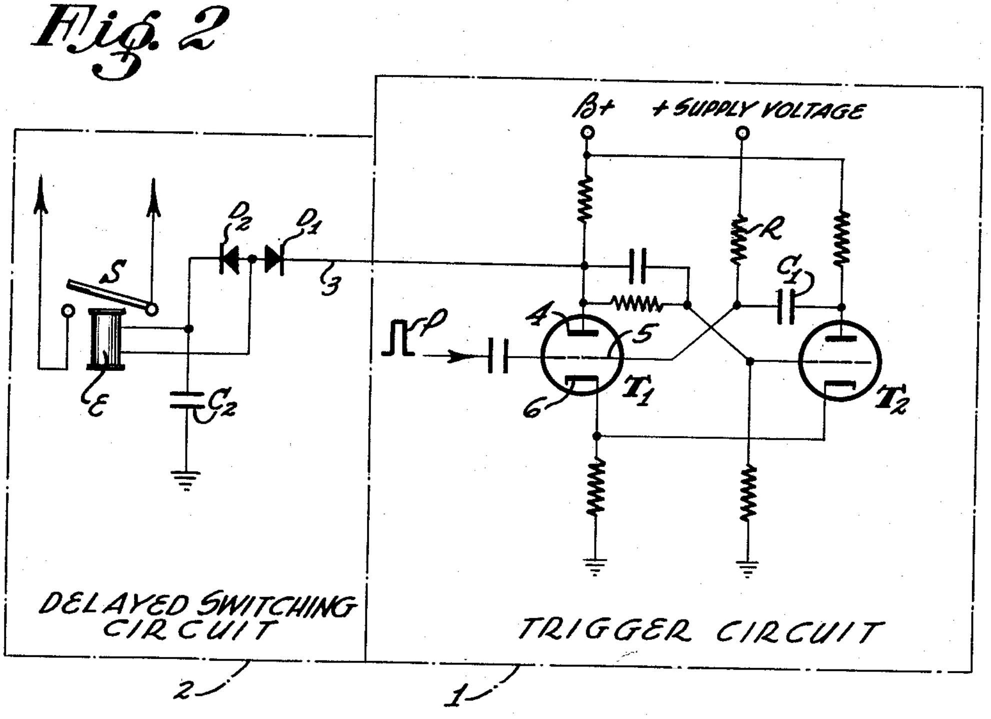
Figure 2 is a schematic diagram of a preferred form of the invention, operating from a trigger circuit.

Referring to Figure 2 the schematic diagram consists of two main components—a trigger circuit 1 and a delayed switching circuit 2. In the particular embodiment illustrated, trigger circuit 1 is of the familiar Eccles-Jordan type. Delayed switching circuit 2, comprising lead 3, crystal diodes $D_1$ and $D_2$, capacitor $C_2$, and relay S with coil E, is a preferred form of the invention.

As is characteristic of the trigger circuit 1 illustrated, conduction alternates between electron tubes $T_1$ and $T_2$ (each consisting of at least a plate 4, grid 5 and cathode 6). Consider first the circuit conditions existing with electron tube $T_1$ cut-off (nonconducting).

The B+ current, unable to flow through electron tube $T_1$, is conveyed via lead 3 to crystal diode $D_1$. Sufficient voltage is applied so as to effect current flow through the high back resistance of crystal diode $D_1$. The resulting current is conveyed through the low forward resistance of crystal diode $D_2$ and said current proceeds to charge capacitor $C_2$.

However, when $T_1$ is caused to conduct as a result of a pulse P of proper polarity applied to grid 5 of electron tube $T_1$, condenser $C_2$ discharges through the low resistance of relay coil E (as compared with the high back resistance of crystal diode $D_2$). Consequently, after an initial delay dependent upon the magnitudes of circuit parameters within the trigger circuit (R and $C_1$, for example), the relay coil E is energized and relay switch S activated.

While in order to comply with the statute, the invention has been described in language more or less specific as to structural features, it is to be understood that the invention is not limited to the specific features shown. For example, the block 1 of Figure 2 need not be a circuit of the type illustrated. In fact, one application of this invention operates from a univibrator developing a positive rectangular wave of about 70 volts amplitude and of about 1 second duration. Furthermore, the delay circuit 2 is not to be considered limited to relay operation. Such current operated devices as solenoids, lamps and a host of other type switches can be adapted into the circuit undergoing specification.

The invention is, therefore, claimed in any of its forms or modifications within the legitimate and valid scope of the appended claims.

What is claimed is:

1. In a delayed switching circuit, a first and a second rectifying means connected to each other in opposed relation, a current-operated device connected directly in parallel with said first rectifying means, charge storage means connected to the end of said parallel combination opposite said second rectifying means, a charge source connected to the free end of said second rectifying means, whereby a charge from said charge source is accumulated in said charge storage means during a given potential input signal to said charge source and a predetermined change in potential of said input signal causes discharge of said charge storage means through said current-operated device after an initial time delay dependent upon the nature of said charge source.

2. In a delayed switching circuit, a first and a second crystal diode connected to each other in opposed relation, a current-operated load device connected in parallel with said first crystal diode, a capacitor connected to the end of said parallel combination opposite said second crystal diode, a trigger circuit connected to the free end of said second crystal diode, whereby a charge from said trigger circuit is accumulated on said capacitor during a given condition within said trigger circuit and a predetermined polarity pulse in said trigger circuit causes discharge of said capacitor through said current operated load device to operate a relay after an initial time delay dependent upon circuit parameters within said trigger circuit.

3. In a delayed switching circuit, a source for providing a plurality of discrete signals, a first unidirectional device connected to the source and disposed to oppose the passage of the signals from the source, a second unidirectional device connected to the first unidirectional device and disposed in opposed relationship to the first unidirectional device to facilitate the passage of the signals from the source, a capacitance connected to the second unidirectional device to become charged upon a flow of current through the first and second unidirectional devices, and a load connected across the second unidirectional device to receive the current flowing from the capacitance upon the discharge of the capacitance.

4. In a delayed switching circuit, a source for providing a plurality of discrete signals, a first unidirectional device connected to the source and disposed to oppose the passage of the signals from the source, a second unidirectional device connected in series with the first unidirectional device and disposed in an opposite relationship to that of the first unidirectional device to facilitate the passage of the signals from the source, a capacitance connected in series with the second unidirectional device to become charged upon the flow of current through the first and second unidirectional devices, and a load connected in parallel with the second unidirectional device to receive the current flowing from the capacitance upon the discharge of the capacitance.

5. In a delayed switching circuit, a capacitance, a first unidirectional device connected to the capacitance to provide for a flow of current to charge the capacitance and to prevent the flow of a discharge current from the capacitance, a load connected to the capacitance to receive the flow of discharge current from the capacitance, a source for providing a plurality of discrete signals, and a second unidirectional device connected to the first unidirectional device and to the source to oppose the passage of the signals from the source, the second unidirectional device having a potential applied to it to provide for the flow of a charging current to the capacitance upon the introduction of the signals from the source.

6. In a delayed switching circuit, a source of voltage, a normally open switch connected to the voltage source, a first unidirectional device connected to the source and to the switch and disposed to oppose the passage of current from the source, a second unidirectional device connected to the first unidirectional device and disposed in opposed relationship to the first unidirectional device to facilitate the passage of current from the source, a capacitance connected to the second unidirectional device to become charged upon a flow of current through the first and second unidirectional devices and to become discharged upon closure of the switch, and a load connected across the second unidirectional device to receive the current flowing from the capacitance upon the discharge of the capacitance.

7. In a delayed switching circuit, a normally open switch, a source of voltage connected to the switch, a first rectifying means connected to the source of voltage and disposed to oppose a flow of current from the source, a second rectifying means connected in series with the first rectifying means and disposed in opposed relationship to the first rectifying means to facilitate the flow of current from the voltage source, a capacitance connected in a circuit with the first and second rectifying means and with the switch for charging during the flow of current through the first and second rectifying means and for discharge upon the closure of the switch, and a load connected in a circuit with the capacitance and the first rectifying means for receiving a current flow from the capacitance upon the discharge of the capacitance.

8. In a delayed switching circuit, a source of voltage, a first unidirectional device connected to the source of voltage to oppose the flow of current from the source, a second unidirectional device connected to the first unidirectional device to facilitate the flow of current from the source of voltage, a capacitance connected to the second unidirectional device for becoming charged upon a flow of current through the first and second unidirectional devices, a load connected to the second unidirectional device and to the capacitance to receive a current flow from the capacitance upon a discharge of the capacitance, a normally open switch connected to the voltage source and the first unidirectional device for preventing a flow of current from the source through the first unidirectional device upon a closure of the switch and for simultaneously producing a discharge of the capacitance through the load.

References Cited in the file of this patent

UNITED STATES PATENTS

| | | |
|---|---|---|
| 2,111,386 | Buchmann et al. | Mar. 15, 1938 |
| 2,208,349 | Ulbricht | July 16, 1940 |
| 2,298,210 | Gulliksen | Oct. 6, 1942 |
| 2,411,531 | Engelhardt | Nov. 26, 1946 |
| 2,463,318 | Schneider | Mar. 1, 1949 |
| 2,483,126 | Davids | Sept. 27, 1949 |
| 2,543,445 | Doolittle | Feb. 27, 1951 |